(12) United States Patent
Han et al.

(10) Patent No.: US 12,183,889 B2
(45) Date of Patent: Dec. 31, 2024

(54) LITHIUM-SULFUR BATTERY ELECTROLYTE AND LITHIUM-SULFUR BATTERY COMPRISING SAME

(71) Applicant: LG ENERGY SOLUTION, LTD., Seoul (KR)

(72) Inventors: Dong Hyeop Han, Daejeon (KR); Changhun Park, Daejeon (KR); Kwonnam Sohn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 472 days.

(21) Appl. No.: 17/628,457

(22) PCT Filed: Apr. 9, 2021

(86) PCT No.: PCT/KR2021/004490
§ 371 (c)(1),
(2) Date: Jan. 19, 2022

(87) PCT Pub. No.: WO2021/210854
PCT Pub. Date: Oct. 21, 2021

(65) Prior Publication Data
US 2022/0263136 A1 Aug. 18, 2022

(30) Foreign Application Priority Data

Apr. 14, 2020 (KR) .................. 10-2020-0045529
Apr. 8, 2021 (KR) .................. 10-2021-0045778

(51) Int. Cl.
*H01M 10/0569* (2010.01)
*H01M 10/0525* (2010.01)
(Continued)

(52) U.S. Cl.
CPC ... *H01M 10/0569* (2013.01); *H01M 10/0525* (2013.01); *H01M 2004/027* (2013.01);
(Continued)

(58) Field of Classification Search
CPC .................. H01M 10/0567; H01M 10/0569
See application file for complete search history.

(56) References Cited

U.S. PATENT DOCUMENTS 6,475,680 B1 11/2002 Arai et al.
7,223,500 B2 * 5/2007 Noh .................. H01M 10/0525
429/340
(Continued)

FOREIGN PATENT DOCUMENTS

CN 1336696 A 2/2002
CN 103915647 A * 7/2014
(Continued)

OTHER PUBLICATIONS

Machine translation of JP2005108-724 (no date) (Year: 0000).*
(Continued)

*Primary Examiner* — Amanda C. Walke
(74) *Attorney, Agent, or Firm* — Birch, Stewart, Kolasch & Birch, LLP (57) ABSTRACT

An electrolyte for a lithium-sulfur battery including a lithium salt, a non-aqueous organic solvent, and an additive. The non-aqueous organic solvent includes an ether compound and a heterocyclic compound. The heterocyclic compound includes one or more double bonds and comprises an oxygen atom or a sulfur atom. The additive includes a carbonate compound.

9 Claims, 5 Drawing Sheets

(51) Int. Cl.
H01M 4/02 (2006.01)
H01M 4/38 (2006.01)
H01M 4/58 (2010.01)

(52) U.S. Cl.
CPC ...... H01M 2004/028 (2013.01); H01M 4/382 (2013.01); H01M 4/581 (2013.01); H01M 2300/0037 (2013.01)

(56) References Cited

U.S. PATENT DOCUMENTS

| | | | | |
|---|---|---|---|---|
| 7,517,612 | B2* | 4/2009 | Ryu | H01M 4/382 429/188 |
| 8,383,276 | B2* | 2/2013 | Muldoon | H01M 10/0525 429/339 |
| 11,031,627 | B2* | 6/2021 | Shatunov | H01M 10/0567 |
| 11,830,982 | B2* | 11/2023 | Ning | H01M 10/0568 |
| 2002/0045102 | A1* | 4/2002 | Jung | H01M 4/5815 429/105 |
| 2002/0102466 | A1 | 8/2002 | Hwang et al. | |
| 2003/0073005 | A1 | 4/2003 | Kim et al. | |
| 2004/0009393 | A1* | 1/2004 | Kim | H01M 10/052 429/188 |
| 2005/0175904 | A1* | 8/2005 | Gorkovenko | H01M 10/052 429/329 |
| 2006/0121355 | A1* | 6/2006 | Kolosnitsyn | H01M 10/0567 429/231.95 |
| 2006/0199080 | A1 | 9/2006 | Amine et al. | |
| 2007/0212615 | A1* | 9/2007 | Jost | H01M 10/0567 429/330 |
| 2011/0008680 | A1 | 1/2011 | Muldoon et al. | |
| 2011/0311884 | A1 | 12/2011 | Armand et al. | |
| 2014/0342242 | A1 | 11/2014 | Egorov et al. | |
| 2014/0363746 | A1* | 12/2014 | He | H01M 10/0569 429/188 |
| 2015/0333374 | A1* | 11/2015 | Moganty | H01M 10/052 429/328 |
| 2016/0322665 | A1 | 11/2016 | Kim et al. | |
| 2016/0336625 | A1 | 11/2016 | Jeong et al. | |
| 2017/0033400 | A1 | 2/2017 | Eitouni et al. | |
| 2017/0194663 | A1 | 7/2017 | Zhamu et al. | |
| 2018/0294476 | A1 | 10/2018 | Zhamu et al. | |
| 2023/0318039 | A1* | 10/2023 | Lee | H01M 10/0568 429/322 |

FOREIGN PATENT DOCUMENTS

| | | | | |
|---|---|---|---|---|
| CN | 105355970 | A | * 2/2016 | ........ H01M 10/0525 |
| CN | 108281659 | A | 7/2018 | |
| CN | 108475808 | A | 8/2018 | |
| CN | 108899579 | A | 11/2018 | |
| CN | 109244472 | A | 1/2019 | |
| CN | 110611084 | A | 12/2019 | |
| CN | 107342438 | B | 5/2020 | |
| CN | 114156541 | A | * 3/2022 | |
| EP | 2017-517860 | A | 6/2017 | |
| EP | 3 831 771 | A1 | 6/2021 | |
| JP | 11-31526 | A | 2/1999 | |
| JP | 11-329497 | A | 11/1999 | |
| JP | 2002-75446 | A | 3/2002 | |
| JP | 2004-63145 | A | 2/2004 | |
| JP | 2005-108724 | A | 4/2005 | |
| JP | 2007-522638 | A | 8/2007 | |
| JP | 2008-532248 | A | 8/2008 | |
| JP | 2012-500833 | A | 1/2012 | |
| JP | 2012-531714 | A | 12/2012 | |
| JP | 2016-219411 | A | 12/2016 | |
| JP | 2018-505961 | A | 2/2019 | |
| KR | 10-0326468 | B1 | 2/2002 | |
| KR | 10-2003-0031396 | A | 4/2003 | |
| KR | 20040023881 | A | * 3/2004 | |
| KR | 10-0450206 | B1 | 9/2004 | |
| KR | 10-2005-0038896 | A | 4/2005 | |
| KR | 20050038897 | A | * 4/2005 | |
| KR | 10-0578797 | B1 | 5/2006 | |
| KR | 10-2006-0135958 | A | 12/2006 | |
| KR | 10-2007-0027512 | A | 3/2007 | |
| KR | 10-2008-0067964 | A | 7/2008 | |
| KR | 10-2013-0079126 | A | 7/2013 | |
| KR | 104051786 | A | 9/2014 | |
| KR | 10-2014-0135038 | A | 11/2014 | |
| KR | 10-2015-0022654 | A | 3/2015 | |
| KR | 10-2015-0072239 | A | 6/2015 | |
| KR | 10-2016-0034183 | A | 3/2016 | |
| KR | 10-2016-0052351 | A | 5/2016 | |
| KR | 10-2016-0128014 | A | 11/2016 | |
| KR | 10-2017-0001375 | A | 1/2017 | |
| KR | 10-2018-0093064 | A | 8/2018 | |
| KR | 20180115591 | A | * 10/2018 | |
| KR | 10-2019-0019026 | A | 2/2019 | |
| KR | 10-1925051 | B1 | 2/2019 | |
| KR | 10-2020-0016045 | A | 2/2020 | |
| WO | WO 2019/208153 | A1 | 10/2019 | |
| WO | WO-2020017378 | A1 | * 1/2020 | |
| WO | WO-2021150772 | A1 | * 7/2021 | ........ H01M 10/052 |

OTHER PUBLICATIONS

Extended European Search Report for European Application No. 21787828.9, dated Nov. 16, 2022.
Chao et al., "Solid-state microelectrochemistry: electrical characteristics of a solid-state microelectrochemical transistor based on poly(3-methylthiophene)", Journal of the American Chemical Society, 1987, vol. 109, No. 7, pp. 2197-2199.
International Search Report for PCT/KR2021/004490 mailed on Jul. 19, 2021.
Qian et al., "High rate and stable cycling of lithium metal anode", Nature Communications, 2015, vol. 6, No. 6362, pp. 1-9.
Yang et al., "A New Type of Electrolyte System To Suppress Polysulfide Dissolution for Lithium-Sulfur Battery", ACS Nano, 2019, vol. 13, No. 8, pp. 9067-9073.
Yang et al., "Pyrrole as a promising electrolyte additive to trap polysulfides for lithium-sulfur batteries", Journal of Power Sources, 2017, vol. 348, pp. 175-182.

* cited by examiner

LITHIUM-SULFUR BATTERY ELECTROLYTE AND LITHIUM-SULFUR BATTERY COMPRISING SAME

TECHNICAL FIELD

The present application claims the benefits of Korean Patent Application No. 10-2020-0045529 on Apr. 14, 2020 with the Korean Intellectual Property Office, and Korean Patent Application No. 10-2021-0045778 on Apr. 8, 2021 with the Korean Intellectual Property Office, the disclosure of which are herein incorporated by reference in their entirety.

The present invention relates to an electrolyte for a lithium-sulfur battery and a lithium-sulfur battery comprising the same.

BACKGROUND ART

As the application range of lithium secondary batteries is expanded to not only portable electronic devices, but also electric vehicles (EV) and electric storage systems (ESS), the demand for lithium secondary batteries with high capacity, high energy density, and long lifetime is increasing.

Among various lithium secondary batteries, the lithium-sulfur battery is a battery system that uses a sulfur-based material including a sulfur-sulfur bond as a positive electrode active material, and uses lithium metal, a carbon-based material in which lithium ions are intercalated/de-intercalated, or silicon or tin forming an alloy with lithium as a negative electrode active material.

In the lithium-sulfur battery, there is an advantage that sulfur, which is the main material of the positive electrode active material, has a low atomic weight, is very rich in resources and thus easy to supply and receive, and is cheap, non-toxic and environmentally friendly.

In addition, the lithium-sulfur battery has a theoretical specific capacity of 1,675 mAh/g arising from the conversion reaction of lithium ions and sulfur ($S_8+16Li^++16e^-\rightarrow 8Li_2S$) in the positive electrode, and when using lithium metal as a negative electrode, the lithium-sulfur battery exhibits a theoretical energy density of 2,600 Wh/kg. Since the theoretical energy density of the lithium-sulfur battery has a very high value compared to the theoretical energy density of other battery systems (Ni-MH battery: 450 Wh/kg, Li—FeS battery: 480 Wh/kg, Li—MnO$_2$ battery: 1,000 Wh/kg, Na—S battery: 800 Wh/kg) and a lithium-ion battery (250 Wh/kg) currently being studied, the lithium-sulfur battery is attracting attention as a high-capacity, eco-friendly, and low-cost lithium secondary battery among secondary batteries being developed to date.

Since lithium metal is not only the lightest metallic element, but also has a remarkably high theoretical specific capacity of 3,860 mAh/g and a very low standard hydrogen electrode (SHE) of −3,045 V, and thus enables the implementation of a battery with high capacity and high energy density, it is being studied as an ideal negative electrode active material for a lithium-sulfur battery in several studies.

However, as lithium metal reacts easily with electrolyte due to its high chemical/electrochemical reactivity, a passivation layer is formed on the surface of the negative electrode. Since such a passivation layer has low mechanical strength, as the charging/discharging of the battery proceeds, its structure collapses, causing a difference in current density in a local area to form lithium dendrite on the surface of the lithium metal. In addition, the lithium dendrite formed in this way causes a short circuit inside the battery and inert lithium (dead lithium), and thus cause a problem of not only increasing the physical and chemical instability of the lithium secondary battery, but also reducing the capacity of the battery and shortening the cycle lifetime.

Due to the high instability of lithium metal as described above, lithium-sulfur batteries using lithium metal as a negative electrode have not been commercialized.

Accordingly, various methods such as introducing a protective layer on the surface of lithium metal or varying the composition of an electrolyte are being studied.

For example, Korean Patent Publication No. 2016-0034183 describes that the loss of the electrolyte and the generation of the dendrite can be prevented by forming a protective layer as a polymer matrix, which can accumulate an electrolyte while protecting a negative electrode on a negative electrode active layer including lithium metal or lithium alloy.

In addition, Korean Patent Publication No. 2016-0052351 discloses that by incorporating a lithium dendrite absorbing material into the polymer protective film formed on the surface of the lithium metal, it is possible to suppress the growth of lithium dendrites, thereby improving the stability and lifetime characteristics of the lithium secondary battery.

In addition, Jiangfeng Qian et al. and Korean Patent Publication No. 2013-0079126 each disclose that by increasing the concentration of the lithium salt or by incorporating a non-aqueous organic solvent comprising 1,3,5-trioxane, 1,3-dioxolane, and fluorine-based cyclic carbonate, characteristics of a battery comprising lithium metal can be improved.

These prior arts either formed a physical protective layer by pre-treating the surface of lithium metal with a material such as an organic/inorganic composite with excellent mechanical properties, or suppressed the reaction between electrolyte and lithium metal or the formation of lithium dendrites to some extent by controlling the chemical reactivity of the electrolyte, but the effect is not sufficient. In addition, in the case of a physical protective layer, a separate process for pretreatment is required, and as the charging/discharging of the battery proceeds, there is a problem that degeneration of the protective layer occurs, such as hardening or swelling of the protective layer. In addition, in the case of using an electrolyte including a specific component, not only is there a limitation on the applicable battery, but also a problem of deterioration of the performance of the battery may be caused. Therefore, there is still a need to develop a lithium-sulfur battery having excellent lifetime characteristics by securing the stability of the lithium metal negative electrode.

PRIOR ART DOCUMENT

Patent Document

Korean Patent Publication No. 2016-0034183 (Mar. 29, 2016), NEGATIVE ELECTRODE FOR RECHARGEABLE LITHIUM BATTERY AND RECHARGEABLE LITHIUM BATTERY COMPRISING SAME Korean Patent Publication No. 2016-0052351 (May 12, 2016), LITHIUM METAL ELECTRODE FOR LITHIUM SECONDARY BATTERY WITH SAFE PROTECTIVE LAYER AND LITHIUM SECONDARY BATTERY COMPRISING THE SAME Korean Patent Publication No. 2013-0079126 (Jul. 10, 2013), ELECTROLYTE FOR LITHIUM METAL BATTERY AND LITHIUM METAL BATTERY INCLUDING THE SAME Non-Patent Document Jiangfeng Qian et al., High rate and stable cycling of lithium metal anode, *Nature Communications* 2015, 6, 6362

DISCLOSURE

Technical Problem

As a result of conducting various studies to solve the above problems, the inventors of the present invention have confirmed that when an electrolyte for a lithium-sulfur battery comprises an carbonate compound as an additive and two specific compounds as a non-aqueous organic solvent, not only the efficiency and stability of the negative electrode including lithium metal can be improved, but also the leaching of lithium polysulfide is suppressed, thereby improving the lifetime of the lithium-sulfur battery, and thus have completed the present invention.

Accordingly, it is an object of the present invention to provide an electrolyte for a lithium-sulfur battery capable of implementing a lithium-sulfur battery having excellent lifetime characteristics.

In addition, it is another object of the present invention to provide a lithium-sulfur battery including the electrolyte.

Technical Solution

In order to achieve the above objects, the present invention provides an electrolyte for a lithium-sulfur battery comprising a lithium salt, a non-aqueous organic solvent, and an additive, wherein the non-aqueous organic solvent comprises an ether compound and a heterocyclic compound, wherein the heterocyclic compound comprises an oxygen atom or a sulfur atom, the heterocyclic compound comprises one or more double bonds, and the additive comprises a carbonate compound.

The carbonate compound may comprise at least one selected from the group consisting of bis(4-nitrophenyl) carbonate, bis(2-nitrophenyl) carbonate, 2-(methylsulfonyl) ethyl 4-nitrophenyl carbonate, benzyl 4-nitrophenyl carbonate, 2-(trimethylsilyl)ethyl 4-nitrophenyl carbonate, vinylene carbonate, fluoroethylene carbonate, vinyl ethylene carbonate, and allyl methyl carbonate.

The carbonate compound may be present in an amount of 0.1 to 10% by weight based on a total of 100% by weight of the electrolyte for the lithium-sulfur battery.

The ether compound may comprise a linear ether compound.

The linear ether compound may comprise at least one selected from the group consisting of dimethyl ether, diethyl ether, dipropyl ether, methylethyl ether, methylpropyl ether, ethylpropyl ether, dimethoxyethane, diethoxyethane, ethylene glycol ethylmethyl ether, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, and polyethylene glycol methylethyl ether.

The heterocyclic compound may be a 3 to 15-membered heterocyclic compound.

The heterocyclic compound may comprise at least one selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene, and 2,5-dimethylthiophene.

The non-aqueous organic solvent may comprise the heterocyclic compound in an amount of 0.1 to 100 volume ratio, relative to a volume ratio of 100 of the ether compound.

The non-aqueous organic solvent may further comprise at least one selected from the group consisting of a cyclic ether compound, an ester compound, an amide compound, a linear carbonate compound, and a cyclic carbonate compound.

In addition, the present invention provides a lithium-sulfur battery comprising the electrolyte for the lithium-sulfur battery.

Advantageous Effects

As the electrolyte for a lithium-sulfur battery according to the present invention comprises a carbonate compound as an additive and two specific compounds as a non-aqueous organic solvent, it can improve the efficiency of the negative electrode comprising lithium metal, suppress the leaching of lithium polysulfide, and form a protective layer on the surface of the negative electrode which is lithium metal, thereby increasing the stability and reaction uniformity of the negative electrode and maximizing the capacity expression of the positive electrode, and thus enabling a longer lifetime of the lithium-sulfur battery.

BEST MODE

Hereinafter, the present invention will be described in more detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used herein is for the purpose of describing particular embodiments only and is not intended to be limiting of the invention. The singular forms "a," "an," and "the" include plural referents unless the context clearly dictates otherwise. It is to be understood that the terms "comprise" or "have" as used in the present specification, are intended to designate the presence of stated features, numbers, steps, operations, components, parts or combinations thereof, but not to preclude the possibility of the presence or addition of one or more other features, numbers, steps, operations, components, parts, or combinations thereof.

The term "composite" as used herein refers to a material that two or more materials are combined to express a more effective function while forming physically and chemically different phases to each other.

The term "polysulfide" as used herein is a concept comprising both "polysulfide ions ($S_x^{2-}$, x=8, 6, 4, 2))" and "lithium polysulfides ($Li_2S_x$ or $LiS_x^-$, x=8, 6, 4, 2)".

As lithium secondary batteries, which were used in portable electronic devices and remained in the limited market, are rapidly expanding into the market of electric vehicle (EV) and energy storage systems and they are becoming light weight, thin, short, and small, there is also a demand for lighter weight and miniaturization of lithium secondary batteries, which are their operating energy sources.

Since a lithium-sulfur battery exhibits high theoretical discharging capacity and theoretical energy density among several secondary batteries, as well as lithium metal, which is mainly used as a negative electrode active material, has a very small atomic weight (6.94 g/a.u.) and density (0.534 g/cm$^3$), thus the lithium-sulfur battery is in the spotlight as a next-generation battery due to its ease of miniaturization and weight reduction.

However, as described above, as lithium metal has high reactivity and easily reacts with an electrolyte, a passivation film is formed on the surface of lithium metal due to spontaneous decomposition of the electrolyte, which causes a non-uniform electrochemical reaction on the surface of the lithium metal, thereby forming inert lithium and lithium dendrite, and thus lowering the efficiency and stability of the negative electrode. In addition, in a lithium-sulfur battery using a sulfur-based material as a positive electrode active material, the lithium polysulfide ($Li_2S_x$, usually x>4) with sulfur having a high oxidation number, among the lithium polysulfide ($Li_2S_x$, x=8, 6, 4, 2) formed in the positive electrode during operation of the battery, is continuously dissolved due to its high solubility in the electrolyte, and leaches out of the reaction zone of the positive electrode, and moves to the negative electrode. At this time, the lithium polysulfide leached from the positive electrode causes a side reaction with the lithium metal, and thus lithium sulfide adheres to the surface of lithium metal, thereby causing the passivation of the electrode, as well as the utilization rate of sulfur is lowered due to the leaching of lithium polysulfide, and thus it is possible to implement only up to about 70% of the theoretical discharging capacity, and as the cycle is proceeded, there is a problem that the capacity and charging/discharging efficiency are rapidly deteriorated, thereby lowing the lifetime characteristic of the battery.

To this end, in the prior art, in order to ensure uniform reactivity on the surface of lithium metal and suppress the growth of lithium dendrites, methods of forming a protective layer on the surface of lithium metal or changing the composition of an electrolyte have been attempted. However, in the case of a protective layer introduced on the surface of lithium metal, high mechanical strength for suppressing lithium dendrites and high ionic conductivity for delivering lithium ions are required at the same time, but the mechanical strength and ionic conductivity are in a trade-off relationship with each other, and thus it is difficult to simultaneously improve the mechanical strength and the ionic conductivity at the same time, and thus the effect of improving the stability of lithium in the protective layer of lithium metal proposed so far is not excellent. In addition, due to the compatibility problem with other elements constituting the battery, the actual application is not easy because it causes serious problems in the performance and operation stability of the battery.

Accordingly, the present invention provides an electrolyte for a lithium-sulfur battery, which comprises a carbonate compound as an additive for the electrolyte for the lithium-sulfur battery, thereby suppressing the leaching of the lithium polysulfide and increasing the efficiency of the negative electrode, and includes two types of compounds as a non-aqueous organic solvent, thereby forming a protective layer on the surface of lithium metal, which is a negative electrode, in the initial discharging stage of the battery, and thus increasing the stability and reaction uniformity of the negative electrode, suppressing the formation of lithium dendrites, and improving the lifetime characteristics of the battery.

Specifically, the electrolyte for a lithium-sulfur battery according to the present invention comprises a lithium salt, a non-aqueous organic solvent, and an additive, wherein the non-aqueous organic solvent comprises an ether compound and a heterocyclic compound including an oxygen atom or a sulfur atom, the heterocyclic compound has one or more double bonds, and the additive comprises a carbonate compound.

In the present invention, the additive is a compound including a carbonate group (carbonate group, C(=O) (O—)$_2$), and a by-product from its reaction with lithium polysulfide contributes to the formation of the protective layer of the negative electrode of lithium metal, and thus an improved stripping/plating process can be performed on the surface of lithium metal, which is a negative electrode. Accordingly, since the efficiency and stability of the negative electrode are improved, the lifetime characteristics of a lithium-sulfur battery comprising the same can be improved. The term "negative electrode efficiency" used in the present invention refers to the percentage of lithium (or other negative electrode active material) replated or re-reduced on the negative electrode, when fully charged, to the amount of lithium newly stripped or oxidized from the negative electrode at the time of the previous full discharging of the battery. Any deviation from 100% indicates inert lithium that has lost utility in charging/discharging the battery.

In addition, since the additive of the present invention reduces the solubility of lithium polysulfide generated from the positive electrode into the electrolyte and suppresses the loss of sulfur which is a positive electrode active material, it is possible to realize a lithium-sulfur battery with improved capacity realization rate, as compared to theoretical specific capacity, by maximizing the capacity expression of the positive electrode active material.

In addition, since the additive of the present invention does not participate in the electrochemical reaction of the battery, and only serves to improve the efficiency and stability of the negative electrode comprising lithium metal and to suppress the elution of lithium polysulfide, there is an advantage that the problem of deterioration in performance of the battery occurring in the prior art does not occur.

The additive according to the present invention may comprise a carbonate compound, and specifically may be a carbonate ester compound represented by the Formula $R_1O$(C=O)$OR_2$. In the above Formula, $R_1$ and $R_2$ are not hydrogen, are the same as or different from each other, and are each independently a hydrocarbon group. The term "hydrocarbon group" as used in the present invention refers to all organic groups consisting of carbon and hydrogen and may comprise any known structures such as an alkyl group, an alkenyl group, an alkynyl group, an aryl group, an aralkyl group, a heteroaryl group, and the like. The carbon in the hydrocarbon group may be replaced with at least one heteroatom selected from the group consisting of oxygen (O), nitrogen (N), and sulfur (S). The hydrocarbon group comprises straight chain, branched chain, monocyclic or polycyclic groups, and at least one hydrogen atom comprised in the hydrocarbon group may be optionally substituted with one or more substituents (e.g. alkyl, alkenyl, alkynyl, heterocyclic, aryl, heteroaryl, acyl, oxo, imino, thiooxo, cyano, isocyano, amino, azido, nitro, hydroxyl, thiol, halo and the like).

For example, the carbonate compound may comprise bis(4-nitrophenyl) carbonate, bis(2-nitrophenyl) carbonate, 2-(methylsulfonyl)ethyl 4-nitrophenyl carbonate, benzyl 4-nitrophenyl carbonate, 2-(trimethylsilyl)ethyl 4-nitrophenyl carbonate, vinylene carbonate, fluoroethylene carbonate, vinyl ethylene carbonate, and allyl methyl carbonate. Preferably, the carbonate compound may be at least one selected from the group consisting of bis(4-nitrophenyl) carbonate, bis(2-nitrophenyl) carbonate, and 2-(methylsulfonyl)ethyl 4-nitrophenyl carbonate, and more preferably, the carbonate compound may be bis(4-nitrophenyl) carbonate.

The carbonate compound may be comprised in an amount of 0.1 to 10% by weight based on a total of 100% by weight of the electrolyte for the lithium-sulfur battery. The content of the carbonate compound as an additive according to the present invention may have a lower limit of 0.1% by weight or more, 0.5% by weight or more, or 1% by weight, and an upper limit of 10% by weight or less, 5% by weight or less, or 3% by weight or less, based on a total of 100% by weight of the electrolyte for the lithium-sulfur battery. The content of the carbonate compound can be set by a combination of the lower limit and the upper limit. When the content of the carbonate compound is less than the above range, it is difficult to reduce the leaching amount of lithium polysulfide, and it cannot act on the entire lithium ions moving during charging/discharging, and thus the uniformity of the stripping/plating process may be lowered, and the effect of improving the efficiency of the negative electrode cannot be obtained. On the contrary, when the content of the additive exceeds the above range, as the solubility of lithium polysulfide is greatly reduced, a problem of lowering reactivity may occur, resulting in loss of capacity or shortening of the lifetime of the battery.

The electrolyte for the lithium-sulfur battery according to the present invention comprises a lithium salt as an electrolyte salt. The type of the lithium salt is not particularly limited in the present invention, and the lithium salt may be used without limitation as long as it is commonly used in an electrolyte for a lithium-sulfur battery.

For example, the lithium salt may comprise at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_3$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, lithium chloroborane, lithium lower aliphatic carboxylic acid having 4 or less carbon atoms, lithium 4-phenyl borate, and lithium imide. Preferably, the lithium salt may be (SO$_2$F)$_2$NLi (lithium bis(fluorosulfonyl)imide, LiFSI).

The concentration of the lithium salt may be determined in consideration of ion conductivity, solubility and the like, and may be, for example, 0.1 to 4.0 M, preferably 0.5 to 2.0 M. When the concentration of the lithium salt is less than the above range, it is difficult to ensure ion conductivity suitable for operating the battery. On the other hand, when the concentration exceeds the above range, the viscosity of the electrolyte solution is increased to lower the mobility of the lithium ion and the decomposition reaction of the lithium salt itself may increase to deteriorate the performance of the battery. Therefore, the concentration is adjusted appropriately within the above range.

The electrolyte for the lithium-sulfur battery according to the present invention comprises a non-aqueous organic solvent as a medium through which ions involved in the electrochemical reaction of the lithium-sulfur battery can move.

In the present invention, the non-aqueous organic solvent comprises an ether compound; and a heterocyclic compound including one or more double bonds and an oxygen atom or a sulfur atom.

The ether compound secures electrochemical stability within the driving voltage range of the battery, while maintaining the solubility of sulfur or sulfur-based compounds, and has relatively little occurrence of side reactions with intermediate products during the operation of the battery.

Preferably, the ether compound may comprise a linear ether compound.

For example, the linear ether compound may comprise at least one selected from the group consisting of dimethyl ether, diethyl ether, dipropyl ether, methylethyl ether, methylpropyl ether, ethylpropyl ether, dimethoxyethane, diethoxyethane, ethylene glycol ethylmethyl ether, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, and polyethylene glycol methylethyl ether. Preferably, the linear ether compound may comprise at least one selected from the group consisting of dimethoxyethane, ethylene glycol ethylmethyl ether, and diethylene glycol dimethyl ether, and more preferably, may be dimethoxyethane.

The heterocyclic compound is a heterocyclic compound including at least one double bond, wherein the heterocycle comprises at least one hetero atom selected from the group consisting of an oxygen atom and a sulfur atom.

The heterocyclic compound may suppress the generation of lithium dendrites by stably forming a protective film (solid electrolyte interface, SEI layer) on the surface of lithium metal, which is a negative electrode, by ring opening polymerization of the heterocyclic compound in the initial discharging stage of the battery, and may further improve the lifetime characteristics of a lithium-sulfur battery by reducing side reactions with an electrolyte or lithium polysulfide on the surface of lithium metal and thus decomposition of the electrolyte. In addition, the heterocyclic compound includes an oxygen atom or a sulfur atom and exhibits polarity, thereby increasing affinity with other components of the electrolyte to promote the formation of the protective film. In addition, the heterocyclic compound may exhibit a characteristic that is difficult to dissolve salt due to delocalization of the lone pair electrons of the hetero atom, and thus may reduce the ability to solvate lithium polysulfide, thereby reducing the leaching amount of polysulfide in the electrolyte. Accordingly, it is possible to suppress an increase in the resistance of the electrolyte for the lithium-sulfur battery, thereby improving the lifetime characteristics of the lithium-sulfur battery.

The heterocyclic compound may be a 3 to 15-membered, preferably 3 to 7-membered, more preferably a 5 to 6-membered heterocyclic compound.

In addition, the heterocyclic compound may comprise a heterocyclic compound substituted or unsubstituted by at least one selected from the group consisting of an alkyl group having 1 to 4 carbon atoms, a cyclic alkyl group having 3 to 8 carbon atoms, an aryl group having 6 to 10 carbon atoms, a halogen group, a nitro group, an amine group, and a sulfonyl group; or a multicyclic compound of a heterocyclic compound and at least one selected from the group consisting of a cyclic alkyl group having 3 to 8 carbon atoms and an aryl group having 6 to 10 carbon atoms.

When the heterocyclic compound comprises a heterocyclic compound substituted with an alkyl group having 1 to 4 carbon atoms, it is preferable because the radical can be stabilized, which can suppress side reactions with other components in the electrolyte. In addition, when a heterocyclic compound substituted with a halogen group or a nitro group is comprised, it is preferable because a functional protective layer can be formed on the surface of lithium metal. The functional protective layer is a stable compact protective layer, which enables uniform deposition of lithium metal and can suppress side reactions between lithium polysulfide and lithium metal.

The heterocyclic compound may comprise at least one selected from the group consisting of a furan compound, a pyran compound, and a thiophene compound.

For example, the heterocyclic compound may comprise at least one selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene, and 2,5-dimethylthiophene. Preferably, it may comprise at least one selected from the group consisting of 2-methylfuran, 2-methylthiophene, and 2,5-dimethylthiophene, and more preferably 2-methylfuran.

In the present invention, the non-aqueous organic solvent comprises the heterocyclic compound in a volume ratio of 0.1 to 100, preferably 25 or more to less than 100, more preferably 25 to 66.7, and most preferably 25 or more to less than 50, relative to a volume ratio of 100 of the ether compound. As the non-aqueous organic solvent, it is advantageous to comprise the ether compound and the heterocyclic compound in the above-described volume ratio range in terms of forming a protective layer and reducing the leaching amount of lithium polysulfide. When the volume ratio of the 2 types of compounds in the non-aqueous organic solvent of the present invention is less than the above range, the formation of the protective layer on the surface of lithium metal is not completely performed. On the contrary, when the volume ratio exceeds the above range, since the lithium salt is not dissolved, it may not be applicable to the battery, or there may be a problem that the lifetime of the battery is decreased due to the increase in resistance at the electrolyte and the surface of lithium metal.

The electrolyte for the lithium-sulfur battery according to the present invention may further comprise an organic solvent commonly used in the electrolyte for the lithium secondary battery in addition to the above-described 2 types of compounds as the non-aqueous organic solvent. For example, at least one selected from the group consisting of a cyclic ether compound, an ester compound, an amide compound, a linear carbonate compound, and a cyclic carbonate compound may be additionally included.

For example, the cyclic ether compound may comprise, but is not limited to, at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, and isosorbide dimethyl ether.

The ester compound may comprise, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone.

The linear carbonate compound may comprise, but is not limited to, at least one selected from the group consisting of dimethyl carbonate, diethyl carbonate, dipropyl carbonate, ethylmethyl carbonate, methylpropyl carbonate, and ethylpropyl carbonate.

The cyclic carbonate compound may comprise, but is not limited to, at least one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, vinylethylene carbonate, and halides thereof.

The electrolyte for the lithium-sulfur battery of the present invention may further comprise nitric acid or a nitrous acid-based compound in addition to the above-described components. The nitric acid or nitrous acid-based compound has the effect of forming a stable film on the lithium electrode and improving the charging/discharging efficiency.

The nitric acid or nitrous acid-based compound is not particularly limited in the present invention, but may be at least one selected from the group consisting of inorganic nitric acid or nitrous acid-based compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$), ammonium nitrite ($NH_4NO_2$); organic nitric acid or nitrous acid-based compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite; organic nitro compounds such as nitromethane, nitropropane, nitrobutane, nitrobenzene, dinitrobenzene, nitropyridine, dinitropyridine, nitrotoluene, dinitrotoluene, and combinations thereof, and preferably may be lithium nitrate.

In addition, the electrolyte of the present invention may further comprise other additives for the purpose of improving charging/discharging characteristics, flame retardancy, and the like. Examples of the additives may be pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, aluminum trichloride, fluoroethylene carbonate (FEC), propene sultone (PRS), and vinylene carbonate (VC).

The electrolyte for the lithium-sulfur battery according to the present invention can improve the efficiency and stability of the negative electrode comprising lithium metal, and reduce the solubility of the lithium polysulfide into the electrolyte by including the carbonate compound as an additive. In addition, the electrolyte for the lithium-sulfur battery of the present invention not only improves the stability of the negative electrode, but also effectively suppresses side reactions between lithium metal and lithium polysulfide generated during operation of the electrolyte or lithium-sulfur battery by including 2 types of compounds as a non-aqueous organic solvent and thus forming a protective layer on the surface of lithium metal. Accordingly, it is possible to improve the lifetime of a lithium-sulfur battery comprising the electrolyte of the present invention.

Also, the present invention provides a lithium-sulfur battery comprising the electrolyte for the lithium-sulfur battery, as described above.

The lithium-sulfur battery comprises a positive electrode, a negative electrode, and an electrolyte interposed therebetween, wherein the electrolyte comprises the electrolyte for the lithium-sulfur battery according to the present invention.

The positive electrode may comprise a positive electrode current collector and a positive electrode active material layer coated on one or both sides of the positive electrode current collector.

The positive electrode current collector supports the positive electrode active material and is not particularly limited as long as it has high conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by having fine irregularities on its surface, and may be formed in various forms such as film, sheet, foil, mesh, net, porous body, foam, or nonwoven fabric.

The positive electrode active material layer comprises a positive electrode active material and may further comprise a conductive material, a binder, additive, and the like.

The positive electrode active material may comprise sulfur, and specifically may comprise at least one selected from the group consisting of elemental sulfur ($S_8$) and a sulfur compound. The positive electrode active material may comprise at least one selected from the group consisting of inorganic sulfur, $Li_2S_n$(n≥1), a disulfide compound, an organic sulfur compound, and a carbon-sulfur polymer $((C_2S_x)_n$, x=2.5 to 50, n≥2). Preferably, the positive electrode active material may be inorganic sulfur.

Sulfur is used in combination with a conductive material such as a carbon material because it does not have electrical conductivity alone. Accordingly, the sulfur is comprised in the form of a sulfur-carbon composite, and preferably, the positive electrode active material may be a sulfur-carbon composite.

The carbon in the sulfur-carbon composite is a porous carbon material and provides a framework capable of uniformly and stably immobilizing sulfur, which is a positive electrode active material, and supplements the low electrical conductivity of sulfur to enable the electrochemical reaction to proceed smoothly.

The porous carbon material can be generally produced by carbonizing precursors of various carbon materials. The porous carbon material may comprise uneven pores therein, the average diameter of the pores is in the range of 1 to 200 nm, and the porosity may be in the range of 10 to 90% of the total volume of the porous carbon material. When the average diameter of the pores is less than the above range, the pore size is only at the molecular level and impregnation with sulfur is impossible. On the contrary, when the average diameter of the pores exceeds the above range, the mechanical strength of the porous carbon material is weakened, which is not preferable for application to the manufacturing process of the electrode.

The shape of the porous carbon material is in the form of sphere, rod, needle, plate, tube, or bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); graphites such as natural graphite, artificial graphite, and expanded graphite, and activated carbon. Preferably, the porous carbon material may be carbon nanotubes.

The sulfur-carbon composite may comprise 60 to 90 parts by weight, preferably 65 to 85 parts by weight, more preferably 70 to 80 parts by weight of sulfur, based on 100 parts by weight of the sulfur-carbon composite. When the content of sulfur is less than the above-described range, as the content of the porous carbon material in the sulfur-carbon composite is relatively increased, the specific surface area is increased, so that the content of the binder is increased during the manufacture of the positive electrode. The increase in the amount of the binder used may eventually increase the sheet resistance of the positive electrode and act as an insulator to prevent electron pass, thereby deteriorating the performance of the battery. On the contrary, when the content of sulfur exceeds the above range, sulfur that cannot be combined with the porous carbon material agglomerates between them or re-leaches to the surface of the porous carbon material, and thus becomes difficult to receive electrons and cannot participate in electrochemical reactions, resulting in loss of the capacity of the battery.

In addition, the sulfur in the sulfur-carbon composite is located on at least one of the inner and outer surfaces of the aforementioned porous carbon material, and at this time, may be present in an area of less than 100%, preferably 1 to 95%, more preferably 60 to 90% of the entire inner and outer surfaces of the porous carbon material. When sulfur is present on the inner and outer surfaces of the porous carbon material within the above range, it can show the greatest effect in terms of the electron transfer area and the wettability with the electrolyte. Specifically, since sulfur is thinly and evenly impregnated on the inner and outer surfaces of the porous carbon material in the above range, the electron transfer contact area may be increased during the charging/discharging process. When sulfur is located in the area of 100% of the entire inner and outer surface of the porous carbon material, the carbon material is completely covered with sulfur, thereby resulting in poor wettability to the electrolyte and has poor contact with the electrically conductive material contained in the electrode and thus cannot receive electrons and cannot participate in the electrochemical reaction.

The method for preparing the sulfur-carbon composite is not particularly limited in the present invention, and a method commonly used in the art may be used. For example, a method of simply mixing sulfur and the porous carbon material and then heat-treating them to form a composite may be used.

The positive electrode active material may further comprise at least one additive selected from a transition metal element, a group IIIA element, a group IVA element, a sulfur compound of these elements, and an alloy of these elements and sulfur, in addition to the above-described components.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg or the like, and the group IIIA element may comprise Al, Ga, In, Tl and the like, and the group IVA element may comprise Ge, Sn, Pb, and the like.

The positive electrode active material may be included in an amount of 40 to 95% by weight, preferably 45 to 90% by weight, more preferably 60 to 90% by weight based on a total of 100% by weight of the positive electrode active material layer constituting the positive electrode. When the content of the positive electrode active material is less than the above range, it is difficult for the positive electrode to sufficiently exert an electrochemical reaction. On the contrary, when the content exceeds the above range, there is a problem that the resistance of the positive electrode is increased and the physical properties of the positive electrode are lowered due to a relatively insufficient content of the electrically conductive material and the binder to be described later.

The positive electrode active material layer may optionally further comprise a conductive material, which allows electrons to move smoothly within the positive electrode (specifically, positive electrode active material), and a binder for well attaching the positive electrode active material to the current collector.

The conductive material is a material that acts as a path, through which electrons are transferred from the current collector to the positive electrode active material, by electrically connecting the electrolyte and the positive electrode active material.

For example, as the conductive material, graphite such as natural graphite or artificial graphite; carbon blacks such as Super P, Denka black, acetylene black, Ketjen black, channel black, furnace black, lamp black, and thermal black; carbon derivatives such as carbon nanotubes and fullerene; electrically conductive fibers such as carbon fiber and metal fiber; carbon fluoride; metal powders such as aluminum and nickel powder or electrically conductive polymers such as polyaniline, polythiophene, polyacetylene, and polypyrrole may be used alone or in combination.

The conductive material may be included in an amount of 1 to 10% by weight, preferably 4 to 7% by weight, based on a total of 100% by weight of the positive electrode active material layer constituting the positive electrode. When the content of the electrically conductive material is less than the above range, since electron transfer between the positive electrode active material and the current collector is not easy, voltage and capacity are reduced. On the contrary, when the content exceeds the above range, the proportion of the positive electrode active material is relatively reduced, so that the total energy (charge) of the battery can be reduced. Therefore, it is desirable to determine an appropriate content within the above-described range.

The binder maintains the positive electrode active material in the positive electrode current collector and organically connects the positive electrode active material to further increase the binding force therebetween, and any binder known in the art can be used as the binder.

For example, the binder may be any one selected from the group consisting of fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxy methyl cellulose (CMC), starch, hydroxypropyl cellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

The content of the binder may be 1 to 10% by weight based on a total of 100% by weight of the positive electrode active material layer constituting the positive electrode. When the content of the binder is less than the above range, the physical properties of the positive electrode may be deteriorated and thus positive electrode active material and the electrically conductive material can be broken away. When the content of the binder exceeds the above range, the ratio of the active material and the electrically conductive material in the positive electrode is relatively reduced and thus the battery capacity can be reduced. Therefore, it is preferable to determine an appropriate amount of the binder within the above-described range.

In the present invention, the method of manufacturing the positive electrode is not particularly limited, and a method known to a person skilled in the art or various methods modified therefrom may be used.

As an example, the positive electrode may be prepared by preparing a positive electrode slurry composition comprising the above-described components and then applying the positive electrode slurry composition to at least one surface of the positive electrode current collector.

The positive electrode slurry composition comprises the positive electrode active material, the conductive material, and the binder as described above, and may further comprise a solvent other than these.

As a solvent, a solvent capable of uniformly dispersing the positive electrode active material, the conductive material, and the binder is used. As such a solvent, water is most preferred as an aqueous solvent. At this time, water may be a distilled water or a deionized water, but is not necessarily limited thereto, and if necessary, a lower alcohol which can be easily mixed with water may be used. Examples of the lower alcohol comprise methanol, ethanol, propanol, isopropanol, and butanol, and they may be preferably used in mixture with water.

The content of the solvent may be included at a level of having such a concentration as to facilitate the coating, and the specific content varies depending on the coating method and apparatus.

The positive electrode slurry composition may additionally comprise, if necessary, a material commonly used for the purpose of improving its function in the relevant technical field. For example, a viscosity adjusting agent, a fluidizing agent, a filler, etc. are mentioned.

The method of applying the positive electrode slurry composition is not particularly limited in the present invention, and for example, methods such as doctor blade, die casting, comma coating, and screen printing may be mentioned. In addition, after molding on a separate substrate, the positive electrode slurry may be applied on the positive electrode current collector by pressing or lamination.

After the application, a drying process for removing the solvent may be performed. The drying process is carried out at a temperature and time at a level capable of sufficiently removing the solvent, and the conditions may vary depending on the type of solvent, and thus are not particularly limited in the present invention. As an example, a drying method by warm air, hot air, or low-humidity air, a vacuum drying method, and a drying method by irradiation with (far)-infrared radiation or electron beam may be mentioned. The drying speed is adjusted so that the solvent can be removed as quickly as possible within the range of speed that does not cause cracks in the positive electrode active material layer due to normal stress concentration or within the range of speed at which the positive electrode active material layer does not peel off from the positive electrode current collector.

Additionally, after the drying, the density of the positive electrode active material in the positive electrode may be increased by pressing the current collector. Methods, such as a mold press and a roll press, are mentioned as a press method.

The porosity of the positive electrode, specifically the positive electrode active material layer manufactured by the above-described components and manufacturing method, may be 40 to 80%, preferably 60 to 75%. When the porosity of the positive electrode is less than 40%, the degree of filling of the positive electrode slurry composition comprising the positive electrode active material, the electrically conductive material, and the binder becomes too high, so that the electrolyte cannot be maintained sufficiently to exhibit ion conduction and/or electric conduction between positive electrode active materials, thereby resulting in deterioration of the output characteristics or cycle characteristics of the battery and resulting in a problem that the overvoltage of the battery and the reduction in discharging capacity become severe. On the contrary, when the porosity of the positive electrode exceeds 80% and has an excessively high porosity, there is a problem that the physical and electrical connection with the current collector is lowered, resulting in a decrease in adhesion and difficulty in reaction, and there is a problem that the energy density of the battery may be lowered because the electrolyte is filled in the increased porosity. Therefore, the porosity is properly adjusted within the above range.

In addition, the loading amount of sulfur in the positive electrode according to the present invention, that is, the mass of sulfur per unit area in the positive electrode active material layer in the positive electrode may be 2 to 15 mg/cm$^2$, preferably 2.5 to 5 mg/cm$^2$.

The negative electrode may comprise a negative electrode current collector and a negative electrode active material layer applied to one or both surfaces of the negative electrode current collector. Also, the negative electrode may be a lithium metal plate.

The negative electrode current collector is for supporting the negative electrode active material layer, and is as described in the positive electrode current collector.

The negative electrode active material layer may comprise a conductive material, a binder, etc. in addition to the negative electrode active material. At this time, the conductive material and the binder are as described above.

The negative electrode active material may comprise a material capable of reversibly intercalating or de-intercalating lithium ion (Lit), a material capable of reacting with lithium ion to reversibly form lithium including compounds, lithium metal, or lithium alloy.

The material capable of reversibly intercalating or de-intercalating lithium ion (Lit) can be, for example, crystalline carbon, amorphous carbon, or a mixture thereof. The material capable of reacting with lithium ion (Lit) to reversibly form lithium including compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically, may be in the form of a lithium metal thin film or a lithium metal powder.

The method of forming the negative electrode active material is not particularly limited, and a method of forming a layer or film commonly used in the art may be used. For example, methods such as compression, coating, and deposition may be used. In addition, a case, in which a thin film of metallic lithium is formed on a metal plate by initial charging after assembling a battery without a lithium thin film in the current collector, is also comprised in the negative electrode of the present invention.

The electrolyte is for causing an electrochemical oxidation or reduction reaction in the positive electrode and the negative electrode through them, and is as described above.

The injection of the electrolyte may be performed at an appropriate step in the manufacturing process of a lithium-sulfur battery depending on the manufacturing process and required physical properties of the final product. That is, it can be applied before assembling the lithium-sulfur battery or in the final stage of assembling.

A separator is additionally comprised between the positive electrode and the negative electrode.

The separator separates or insulates the positive electrode and the negative electrode from each other and enables lithium ions to be transported between the positive electrode and the negative electrode, and may be made of a porous non-conductive or insulating material. The separator may be used without particular limitation as long as it is used as a separator in a typical lithium-sulfur battery. The separator may be an independent member such as a film or a coating layer added to the positive electrode and/or the negative electrode.

As the separator, a separator with excellent impregnating ability for the electrolyte along with low resistance to ion migration in the electrolyte is preferable.

The separator may be made of a porous substrate. Any of the porous substrates can be used as long as it is a porous substrate commonly used in a lithium-sulfur battery. A porous polymer film may be used alone or in the form of a laminate. For example, a non-woven fabric made of high melting point glass fibers, or polyethylene terephthalate fibers, etc. or a polyolefin-based porous membrane may be used, but is not limited thereto.

The material of the porous substrate is not particularly limited in the present invention, and any material can be used as long as it is a porous substrate commonly used in a lithium-sulfur battery. For example, the porous substrate may comprise at least one material selected from the group consisting of polyolefin such as polyethylene and polypropylene, polyester such as polyethyleneterephthalate and polybutyleneterephthalate, polyamide, polyacetal, polycarbonate, polyimide, polyetheretherketone, polyethersulfone, polyphenylene oxide, polyphenylenesulfide, polyethylenenaphthalate, polytetrafluoroethylene, polyvinylidene fluoride, polyvinyl chloride, polyacrylonitrile, cellulose, nylon, poly(p-phenylene benzobisoxazole, and polyarylate.

The thickness of the porous substrate is not particularly limited, but may be 1 to 100 μm, preferably 5 to 50 μm. Although the thickness range of the porous substrate is not particularly limited to the above-mentioned range, when the thickness is excessively thinner than the lower limit described above, mechanical properties are deteriorated and thus the separator may be easily damaged during use of the battery.

The average size and porosity of the pores present in the porous substrate are also not particularly limited, and may be 0.001 μm to 50 μm and 10 to 95%, respectively.

In the case of the lithium-sulfur battery according to the present invention, it is possible to perform laminating or stacking and folding processes of the separator and the electrode, in addition to the winding process which is a general process.

The shape of the lithium-sulfur battery is not particularly limited, and may have various shapes such as a cylindrical type, a stacked type, and a coin type.

In addition, the present invention provides a battery module comprising the lithium-sulfur battery as a unit battery.

The battery module can be used as a power source for medium-sized and large-sized devices that require high temperature stability, long cycle characteristics, high capacity characteristics and the like.

Examples of the medium-sized and large-sized device may comprise a power tool that is powered by a battery powered motor; electric cars comprising an electric vehicle (EV), a hybrid electric vehicle (HEV), a plug-in hybrid electric vehicle (PHEV), and the like; an electric motorcycle comprising an electric bike (E-bike) and an electric scooter (E-scooter); an electric golf cart; and a power storage system, but are not limited thereto.

MODE FOR INVENTION

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention. Such variations and modifications are within the scope of the appended claims.

EXAMPLE AND COMPARATIVE EXAMPLE

Example 1

A solution was prepared by dissolving 0.75 M LiFSI and 3.0% by weight of lithium nitrate in an organic solvent consisting of 2-methylfuran and dimethoxyethane (2-methylfuran:DME=1:2 (volume ratio)). Subsequently, an electrolyte was prepared by adding bis(4-nitrophenyl) carbonate to the solution so that the content is 1.4% by weight based on a total of 100% by weight of the electrolyte.

Example 2

A positive electrode slurry composition was prepared by mixing 87.5% by weight of sulfur-carbon composite (S:C=75:25 (weight ratio)) as a positive electrode active material, 5.0% by weight of Denka black as a conductive material, and 7.5% by weight of styrene butadiene rubber/carboxymethyl cellulose (SBR:CMC=70:30 (weight ratio)) as a binder.

The positive electrode slurry composition was coated on an aluminum current collector having a thickness of 20 μm dried at 100° C. for 12 hours, and pressed with a roll press instrument to prepare a positive electrode. At this time, the loading amount of the positive electrode active material was 5.6 mAh/cm$^2$ or less, and the porosity of the positive electrode was 70%.

A lithium-sulfur battery was prepared by placing the prepared positive electrode and negative electrode facing each other, interposing a polyethylene separator having a thickness of 16 μm and a porosity of 45% therebetween, and injecting 70 μl of the electrolyte prepared in Example 1.

At this time, a lithium metal thin film having a thickness of 45 μm was used as the negative electrode.

Example 3

An electrolyte was prepared in the same manner as in Example 1, except that the volume ratio of 2-methylfuran and dimethoxyethane was changed to 1:4 and the content of bis(4-nitrophenyl) carbonate was changed to 2.0% by weight.

Example 4

A lithium-sulfur battery was manufactured in the same manner as in Example 2, except that the electrolyte of Example 3 was used instead of the electrolyte of Example 1.

Comparative Example 1

An electrolyte was prepared in the same manner as in Example 1, except that bis(4-nitrophenyl) carbonate was not added.

Comparative Example 2

An electrolyte was prepared in the same manner as in Example 1, except that only dimethoxyethane was used as an organic solvent and the content of bis(4-nitrophenyl) carbonate was changed to 1.3% by weight.

Comparative Example 3

Figure 1:
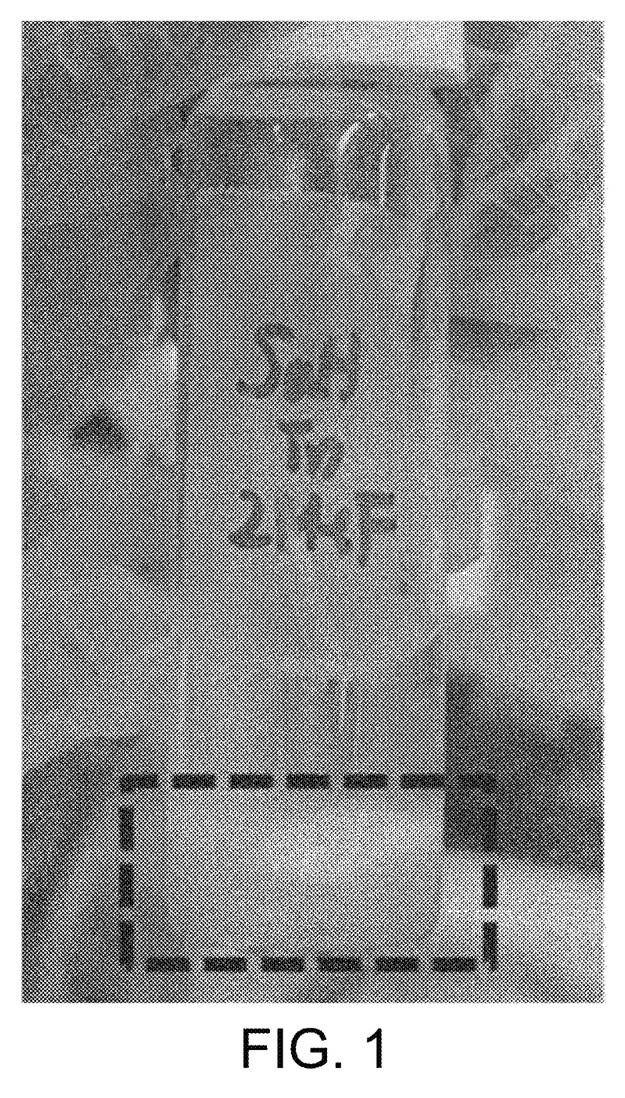
FIG. 1 is a photograph showing the electrolyte according to Comparative Example 3.

An electrolyte was prepared in the same manner as in Example 1, except that only 2-methylfuran was used as an organic solvent and bis(4-nitrophenyl) carbonate was not added. However, as shown in FIG. 1, the lithium salt was not dissolved and precipitated, and thus it was not applicable to the battery.

Comparative Example 4

An electrolyte was prepared by dissolving 1.0 M LiTFSI and 2.4% by weight of lithium nitrate in an organic solvent consisting of 1,3-dioxolane and dimethoxyethane (DOL:DME=1:1 (volume ratio)).

Comparative Example 5

A solution was prepared by dissolving 1.0 M LiTFSI and 2.4% by weight of lithium nitrate in an organic solvent consisting of 1,3-dioxolane and dimethoxyethane (DOL:DME=1:1 (volume ratio)). Subsequently, an electrolyte was prepared by adding bis(4-nitrophenyl) carbonate to the solution so that the content is 1.2% by weight, based on a total of 100% by weight of the electrolyte.

Comparative Example 6

An electrolyte was prepared in the same manner as in Example 1, except that only dimethoxyethane was used as an organic solvent and bis(4-nitrophenyl) carbonate was not added.

Comparative Example 7

A lithium-sulfur battery was manufactured in the same manner as in Example 2, except that the electrolyte of Comparative Example 1 was used instead of the electrolyte of Example 1.

Comparative Example 8

A lithium-sulfur battery was manufactured in the same manner as in Example 2, except that the electrolyte of Comparative Example 2 was used instead of the electrolyte of Example 1.

Comparative Example 9

A lithium-sulfur battery was manufactured in the same manner as in Example 2, except that the electrolyte of Comparative Example 4 was used instead of the electrolyte of Example 1.

Comparative Example 10

A lithium-sulfur battery was manufactured in the same manner as in Example 2, except that the electrolyte of Comparative Example 5 was used instead of the electrolyte of Example 1.

Comparative Example 11

A lithium-sulfur battery was manufactured in the same manner as in Example 2, except that the electrolyte of Comparative Example 6 was used instead of the electrolyte of Example 1.

Experimental Example 1. Surface Evaluation of Negative Electrode of Li/Li Symmetric Cell Two lithium metal thin films having a thickness of 45 μm were used as negative electrodes, and 100 μl of the electrolytes prepared in Example 1 and Comparative Example 1 were respectively injected to prepare a Li/Li symmetric cell.

After charging and discharging the prepared Li/Li symmetric cells of Example 1 and Comparative Example 1 once under the condition of 50% depth of discharge (DOD) and 0.3 C, the surface of the negative electrode was observed under a scanning electron microscope (SEM). At this time, S-4800 from Hitachi company was used as a scanning electron microscope. The results obtained at this time were shown in FIGS. 2 and 3.

Figure 2:
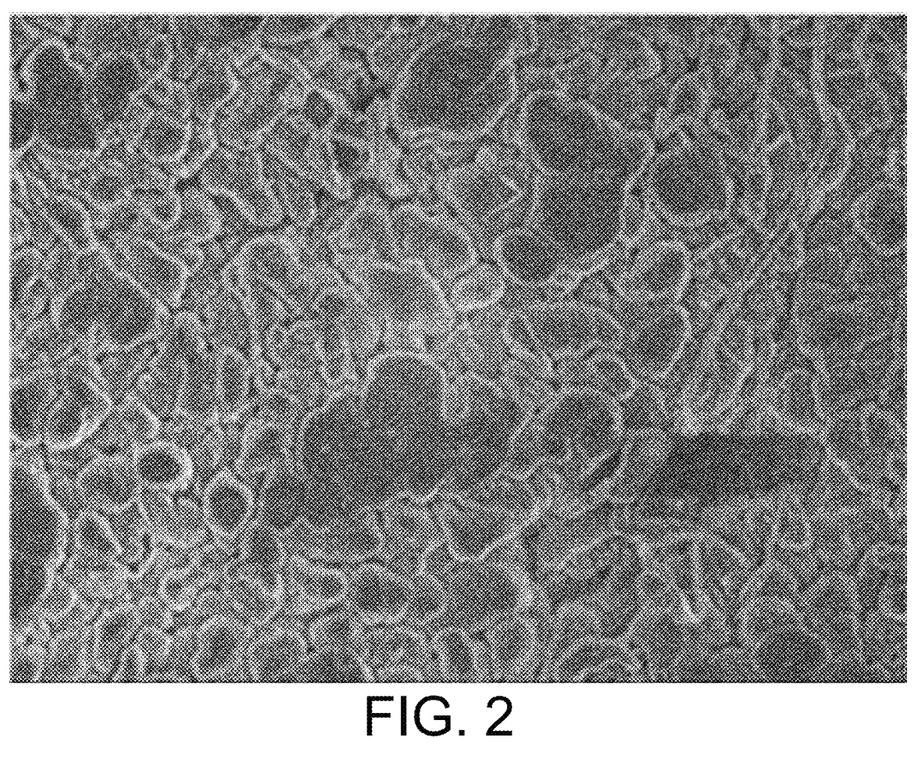
FIG. 2 is a scanning electron microscope (SEM) photograph showing the surface of the negative electrode of a Li/Li symmetric cell comprising the electrolyte of Example 1 according to Experimental Example 1.
Figure 3:
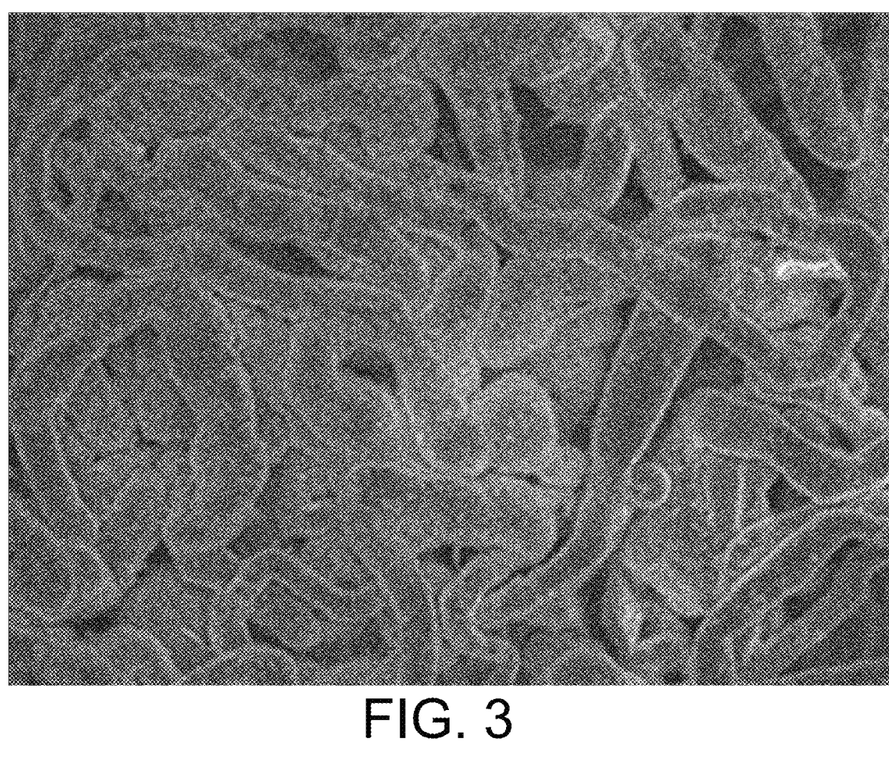
FIG. 3 is a scanning electron microscope (SEM) photograph showing the surface of the negative electrode of a Li/Li symmetric cell comprising the electrolyte of Comparative Example 1 according to Experimental Example 1.

Referring to FIGS. 2 and 3, it can be seen that when the electrolyte of Example 1 is comprised, lithium grows in granular phase on the surface of the negative electrode, whereas when the electrolyte of Comparative Example 1 is comprised, lithium grows in the dendritic phase on the surface of the negative electrode.

From these results, it can be seen that in the electrolyte for a lithium-sulfur battery of the present invention, the additive can suppress the growth of lithium dendrites and thus improve the stability of the negative electrode by improving the efficiency on the surface of the negative electrode.

Experimental Example 2. Evaluation of Battery Performance

The performance of the batteries manufactured in Examples 2 to 4 and Comparative Examples 7 to 11 was evaluated using a charging/discharging measuring device (LAND CT-2001A, manufactured by Wuhan company).

Specifically, initial discharging at 25° C. to 0.1 C under cut-off conditions in the range of 1.8 to 2.5V and charging/discharging for 2 cycles at 0.1 C/0.1 C were performed, and then charging/discharging at 0.2 C/0.2 C was performed for 3 cycles, and charging/discharging at 0.3 C/0.5 C was repeated up to 500 cycles to measure performance. The results obtained at this time were shown in Table 1 and FIGS. 4 and 5.

TABLE 1

| | Discharging capacity per unit weight of positive electrode active material (mAh/$g_{sulfur}$) | | | Number of cycles at which the 0.5 C discharging capacity retention rate reaches 80% (cycles) |
|---|---|---|---|---|
| | 1st discharging | 6 cycles | 200 cycles | |
| Example 2 | 1087 | 806 | 778 | 312 |
| Example 4 | 1057 | 808 | 766 | 360 |
| Comparative Example 7 | 1098 | 811 | 703 | 238 |
| Comparative Example 8 | 1070 | 805 | 529 | 166 |
| Comparative Example 9 | 1090 | 215 | — | — |
| Comparative Example 10 | 1095 | 206 | — | — |
| Comparative Example 11 | 1114 | 853 | — | 85 |

Figure 4:
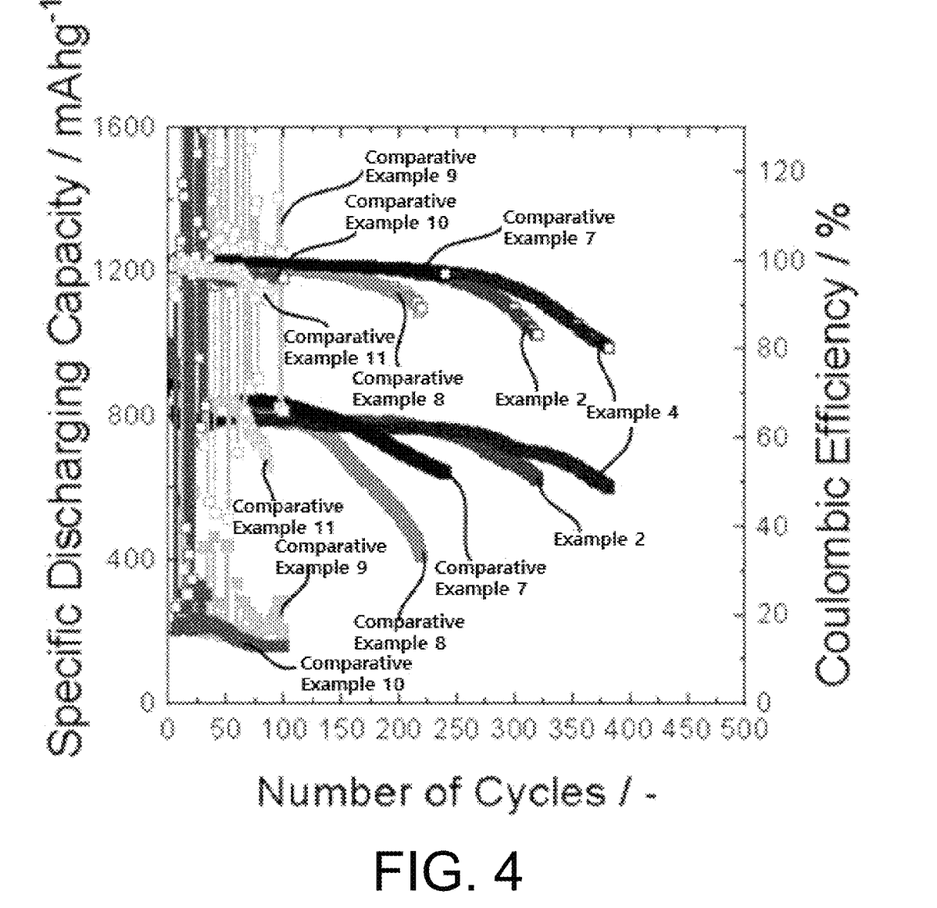
FIG. 4 is a graph showing evaluation results of lifetime characteristics of lithium-sulfur batteries according to Examples 2 and 4 and Comparative Examples 7 to 11.
Figure 5:
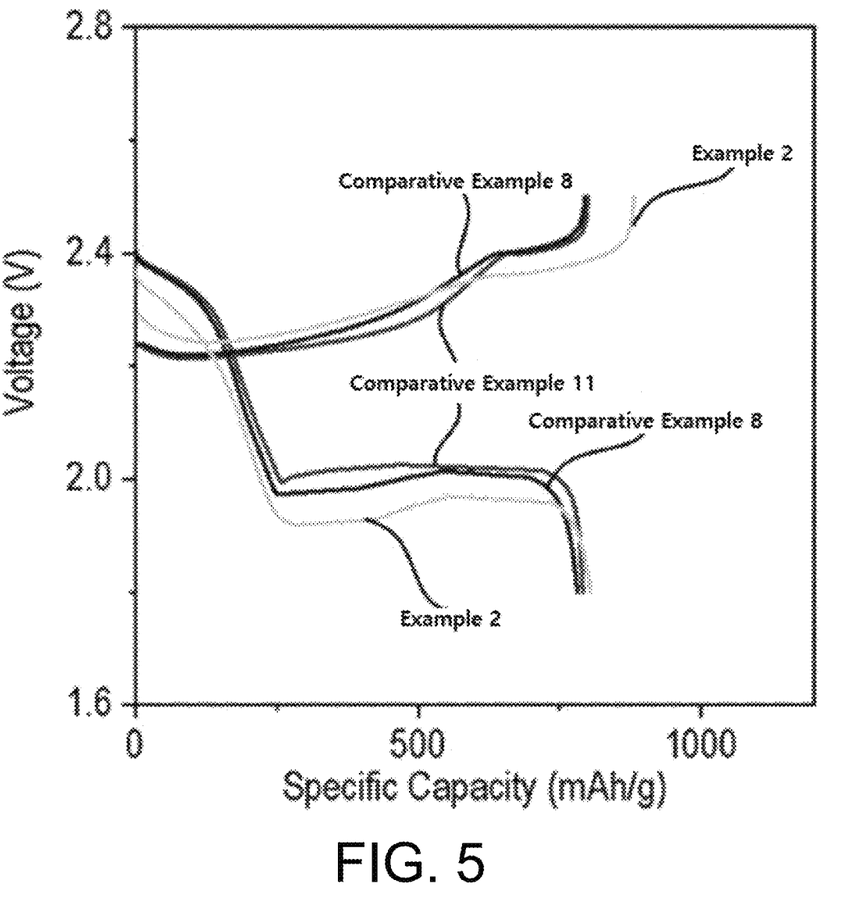
FIG. 5 is a graph showing evaluation results of lifetime characteristics of lithium-sulfur batteries according to Example 2 and Comparative Examples 8 and 11.

As shown in Tables 1, and FIGS. 4 and 5, it can be seen that in the case of batteries according to Examples, the lifetime characteristics are superior to those of Comparative Examples.

Specifically, it can be seen from FIG. 4 that the batteries of Examples 2 and 4 exhibit a high-capacity retention rate due to a small slope of the discharging capacity relative to the cycle, and thus have superior lifetime characteristics compared to the batteries of Comparative Examples 7 to 11. In particular, it can be seen that the batteries of Comparative Examples 8 to 11 have poor lifetime characteristics because a protective layer cannot be formed on the surface of the negative electrode as the comprised electrolyte does not contain a heterocyclic compound.

In addition, the cycle at which the discharging capacity retention rate based on 0.5 C discharge reaches 80% is 312 cycles in the case of Example 2 and 360 cycles in the case of Example 4, whereas the cycle is 238 cycles in the case of Comparative Examples 7, 166 cycles in the case of Comparative Example 8, and 85 cycles in the case of Comparative Example 11, and the operation at 0.5 C is impossible in the case of Comparative Examples 9 and 10, and thus it can be seen that the lifetime characteristic is remarkably low.

In addition, it can be seen from FIG. 5 that the battery of Example 2 has excellent capacity characteristics as well as high lifetime characteristics, whereas the batteries of Comparative Examples 8 and 11 have inferior capacity and lifetime characteristics compared to Example.

From these results, it can be seen that the electrolyte for a lithium-sulfur battery of the present invention not only increases the efficiency of the negative electrode and suppresses the elution of lithium polysulfide, but also increases the stability of lithium metal and suppresses the formation of lithium dendrites by forming a protective layer on the surface of the negative electrode, thereby improving the lifetime characteristics of a lithium-sulfur battery.

The invention claimed is:

1. An electrolyte for a lithium-sulfur battery comprising:
a lithium salt;
a non-aqueous organic solvent; and
an additive,
wherein the non-aqueous organic solvent comprises a linear ether compound and a heterocyclic compound, wherein the heterocyclic compound comprises an oxygen atom or a sulfur atom,
wherein the heterocyclic compound comprises one or more double bonds, and
wherein the additive comprises a carbonate compound;
wherein the carbonate compound comprises at least one selected from the group consisting of bis(4-nitrophenyl)carbonate, bis(2-nitrophenyl)carbonate, 2-(methylsulfonyl)ethyl 4-nitrophenyl carbonate, benzyl 4-nitrophenyl carbonate, 2-(trimethylsilyl)ethyl 4-nitrophenyl carbonate, vinylene carbonate, vinyl ethylene carbonate, and allyl methyl carbonate,
wherein the linear ether compound comprises at least one selected from the group consisting of dimethyl ether, diethyl ether, dipropyl ether, methylethyl ether, methylpropyl ether, ethylpropyl ether, dimethoxyethane, diethoxyethane, ethylene glycol ethylmethyl ether, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, and polyethylene glycol methylethyl ether, and
wherein the heterocyclic compound comprises at least one selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene, and 2,5-dimethylthiophene.

2. The electrolyte for the lithium-sulfur battery according to claim 1, wherein the carbonate compound is present in an amount of 0.1% to 10% by weight based on a total of 100% by weight of the electrolyte for the lithium-sulfur battery.

3. The electrolyte for the lithium-sulfur battery according to claim 1, wherein the non-aqueous organic solvent comprises the heterocyclic compound in a volume ratio of 0.1 to 100, relative to a volume ratio of 100 of the ether compound.

4. The electrolyte for the lithium-sulfur battery according to claim 3, wherein the non-aqueous organic solvent comprises the heterocyclic compound in a volume ratio of 25 or more to less than 100, relative to a volume ratio of 100 of the ether compound.

5. The electrolyte for the lithium-sulfur battery according to claim 1, wherein the non-aqueous organic solvent further comprises at least one selected from the group consisting of a cyclic ether compound, an ester compound, an amide compound, a linear carbonate compound, and a cyclic carbonate compound.

6. A lithium-sulfur battery comprising:
a positive electrode comprising a positive electrode active material;
a negative electrode comprising a negative electrode active material; and
the electrolyte according to claim 1.

7. The lithium-sulfur battery according to claim 6, wherein the positive electrode active material comprises at least one selected from the group consisting of elemental sulfur and a sulfur compound.

8. The lithium-sulfur battery according to claim 6, wherein the positive electrode active material comprises at least one selected from the group consisting of inorganic sulfur, $Li_2S_n$ ($n \geq 1$), a disulfide compound, an organic sulfur compound, and a carbon-sulfur polymer having the formula $(C_2S_x)_n$, where x=2.5 to 50, and $n \geq 2$.

9. The lithium-sulfur battery according to claim 6, wherein the negative electrode active material comprises at least one selected from the group consisting of lithium metal and lithium alloy.

* * * * *